United States Patent [19]

Kokrhanek

[11] Patent Number: 4,743,509

[45] Date of Patent: May 10, 1988

[54] FURNITURE VENEER AND METHOD OF MAKING SAME

[75] Inventor: Vladimiro Kokrhanek, Vigevano, Italy

[73] Assignee: Industria & Moda di A. Pesek, Vigevano, Italy

[21] Appl. No.: 55,033

[22] Filed: May 28, 1987

Related U.S. Application Data

[63] Continuation-in-part of Ser. No. 883,002, Apr. 7, 1986, abandoned, which is a continuation of Ser. No. 651,805, Sep. 18, 1984, abandoned.

[30] Foreign Application Priority Data

Jul. 10, 1983 [IT] Italy .............................. 23186 A/83

[51] Int. Cl.[4] ........................ B32B 21/14; B32B 27/40

[52] U.S. Cl. ................................ 428/425.1; 144/348; 156/61; 156/235; 156/238; 156/240; 156/241; 428/151; 428/537.1

[58] Field of Search ............... 144/346, 348, 352, 362, 144/380; 156/61, 230, 235, 238, 240, 241, 307.5; 428/151, 425.1, 537.1

[56] References Cited

U.S. PATENT DOCUMENTS

| | | | |
|---|---|---|---|
| 671,467 | 4/1901 | Brown | 144/346 X |
| 1,893,384 | 1/1933 | Werner | 156/241 |
| 3,953,635 | 4/1976 | Dunning | 156/61 X |
| 4,125,655 | 11/1978 | Kanzelberger | 156/230 X |
| 4,169,005 | 9/1979 | Fogel et al. | 144/348 X |

*Primary Examiner*—Robert A. Dawson

*Attorney, Agent, or Firm*—Amster, Rothstein & Ebenstein

[57] ABSTRACT

A method for producing a veneer which provides the appearance of a prized wood comprises the steps of applying thermoplastic contact adhesive layers both to the non-thermoplastic surface of the common wood veneer and to the thermo-adhesive surface of a hot stamping foil. The contact adhesive layers of the veneer and foil are united without heat or pressure and then heat and pressure are applied to the united veneer and foil to effect fusion thereof. Another aspect of the invention comprises a veneer produced by the foresaid method.

21 Claims, 1 Drawing Sheet

FIG. 1
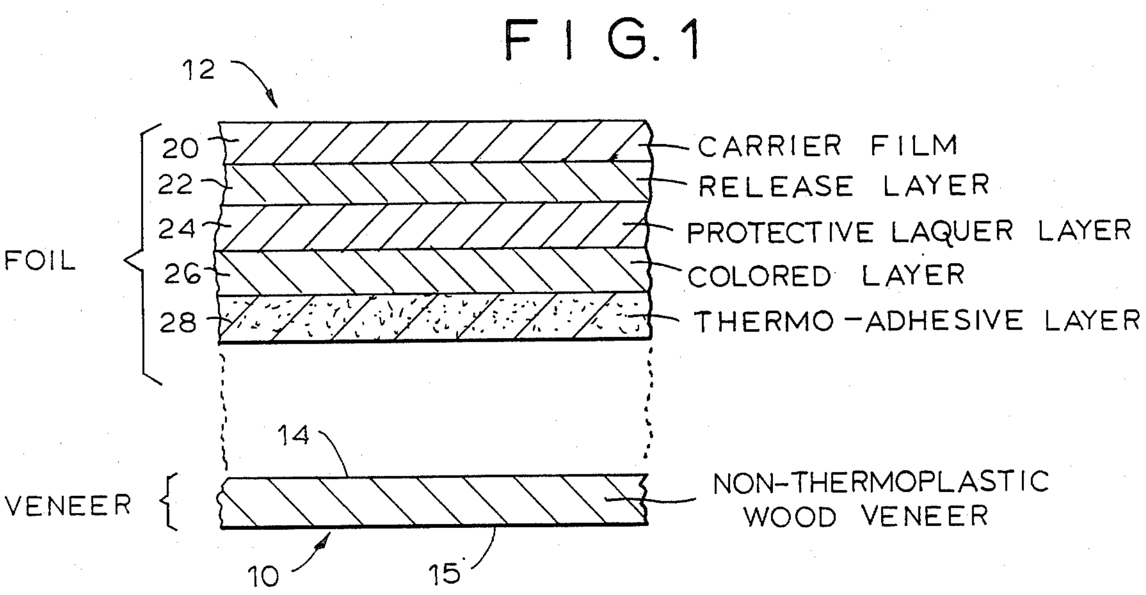
FIG. 2
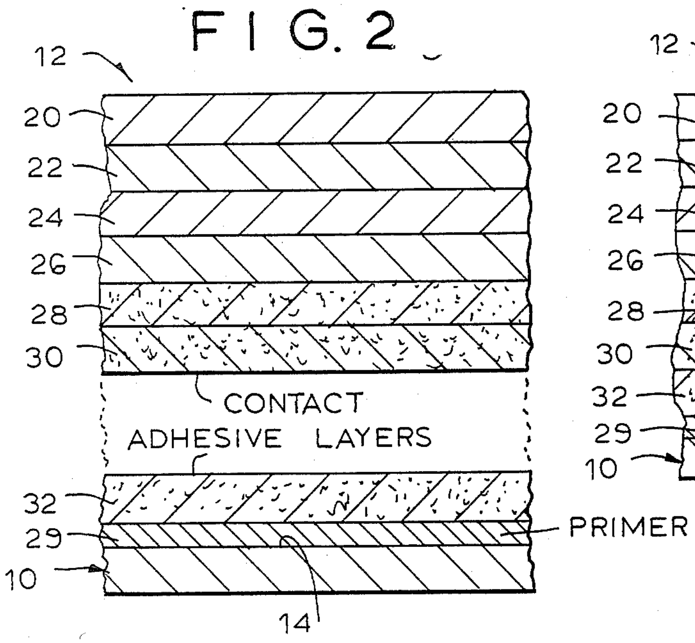
FIG. 3
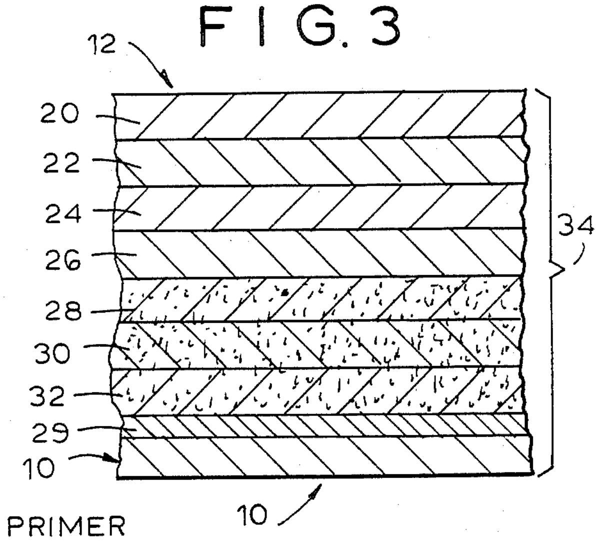
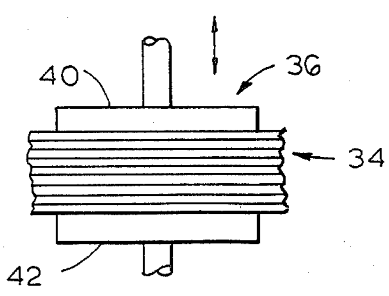
FIG. 4
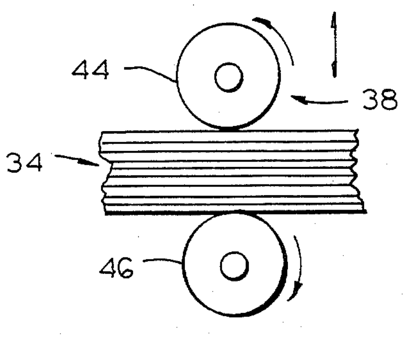
FIG. 5

FURNITURE VENEER AND METHOD OF MAKING SAME

CROSS-REFERENCE TO RELATED APPLICATIONS

This is a continuation-in-part of U.S. patent application Ser. No. 883,002, filed July 7, 1986, now abandoned, which was a continuation of U.S. patent application Ser. No. 651,805, filed Sept. 18, 1984, now abandoned.

BACKGROUND OF THE INVENTION

The present invention relates generally to a furniture veneer and method of making same, and, more particularly, to a common wood veneer having a surface imitating that of a prized wood, and a method of making same.

The truly prized woods, such as nut burl, olive burl, myrtle burl and the like, are not only very expensive, but very difficult to find on the market. In addition, the true burl has small and irregular sizes and exhibits holes and other defects. Therefore, when veneer sheets are obtained therefrom, scraps on the order of 30–40% occur, and the manufacturing process is more complicated and expensive than in the case of the common wood veneers. Accordingly, the cost of finished burl veneer—both in terms of material and manufacturing—is almost prohibitively high.

For these reasons, various attempts have been made to obtain veneers made from common wood (e.g., birch of African nut), but having a surface imitating that of a prized wood (e.g., a burl). The various attempts have not proven entirely satisfactory, however, as they require a rather complex manufacturing procedure and result in an imitation having such a low degree of definition that, even without a too accurate inspection, it is easily noted as only an imitation. Generally, these attempts have utilized a transfer picture (decalcomania) reproducing the wood grain design appearance of the prized wood to be imitated, the transfer picture being applied to the surface of a veneer of common wood by means of a hot press. Much of the difficulty encountered out arises of the nature of the common wood veneers. The wood veneers are typically 0.6–0.7 millimeters thick, composed of hard longitudinal fibers and soft pulp, with a rough surface. Very often one part of the veneer is more porous or thicker or softer than the remainder. Many veneers are corrugated, resulting in the uneven absorption of humidity. Thus, in the hot stamping process the veneer's rough wood surface, its irregular thickness, its irregular hardness and its corrugated surface cause the formation of unacceptable longitudinal creases (when a hot roll press is used) or bubbles (when a hot platen press is used) as a result of thermoplastic flow in the heat-softened surface of the hot stamping foil, thereby distorting the image of the prized wood to be imparted to the common wood veneer.

More particularly, in the hot roll press process, the silicone rolls are at a temperature (160°–180° C.) sufficient to cause the carrier film of the hot stamping foil to approach its melting point and soften. Thus, the hot roll tends to press the softened carrier film into the soft pulp between the hard fiber ribs of the veneer, thus creating the longitudinal creases found in approximately 40% of the veneers formed by this process. In the hot platen press process, the hot expanding air from the heated pores of the thermoplastic layer of the wood surface gives rise to bubbles, which are typically unable to escape from the two surfaces under pressure (that is, the thermoplastic layer of the wood surface and the foil). This is a severe problem when large surfaces are involved (for example, 700×260 cm), although a much lesser or even insignificant problem where the foil surface has at least one dimension so small as to enable any potential bubbles to escape from between the two surfaces. A further deficiency of the hot roll press process is that, despite use of a low production speed (for example, three meters per minute), the contact time of the hot rolls with the laminate is too short with resultant poor adhesion and poor abrasion resistance of the transfer.

Indeed, as illustrated in U.S. Pat. No. 1,893,384, the heretofore unavoidable distortions in a transferred picture due to the direct contact with the structure and grain of the common wood veneer have led to transfer systems in which a smoothed and pasted wood surface is completely covered by an aqueous transfer picture which hides from view the natural wood structure. The process, however, leaves the picture surface so highly water-sensitive that it cannot be cleaned with water-containing cleaners, becomes sticky in high humidity, and generally is not adapted for use on furniture. Similarly, U.S. Pat. No. 4,125,655 describes small plaques which are formed by applying a hot stamping foil ($\frac{7}{8}$ inch wide) under localized heat and pressure to a smooth decorative thermoplastic film (such as Mylar) laminated on a plastic plate readily deformable by moderate heat and pressure. The foil is so narrow that potential bubbles are able to escape from under the foil without becoming trapped.

While some creasing or bubbling of the heat softened surface of the hot stamping foil may be acceptable in certain applications involving non-discriminating purchasers and may even produce relatively satisfactory products where the veneer is of such small dimensions that the imperfections caused by the creases and bubbles may be trimmed away (for example, in the manufacture of such small items as plaques), in the furniture industry, all purchasers are extremely discriminating and the veneer applications are so extensive in area as to make the trimming solution impractical.

Wood is practically non-thermoplastic and relatively insensible within limits to water, steams, heat and solvents. Accordingly, there are instances where the hot stamping foils do not stamp (i.e., do not leave the color transfer) on the wood or, if they do stamp, the poor adhesion of the transfer to the wood provides a very low level of resistance to abrasion, scratching, etc. While many applications will not require the various resistances and strengths achieved by adequate adhesion of the transfer to the wood, in the furniture industry such resistances and strengths are critical both during the manufacturing process and thereafter. For example, resistance to hot water and steam is essential when the veneer will be pressed in a platen press (typically for 80 seconds at 110° C.) when glued to a substrate using aqueous-reactive glues such as urea, urea melanine, or the like. Resistance to solvents—e.g., immersion in a solvent such as ethyl acetate for two minutes—is essential when the veneer is to be glued to a substrate (such as a chip board) with solvent glues or washed with solvents or lacquered during the furniture manufacturing process. Resistance to heat and humidity is also critical when the furniture is to be used in tropical countries where humidities of 95% and temperatures of 45° C. may be encountered. Indeed, under transport in enclosed containers, similar humidities and temperatures up to even 80° C. may be encountered. Resistance to immersion in water is also critical where the furniture may be exposed to rain during transport or other circumstances. And, of course, the veneer must be resistant to the oils found naturally in the wood or solvents applied during maintenance of the furniture (for example, during polishing). Finally, all this must be accomplished in a veneer of substantial size (e.g., up to 700×260 centimeters), while permitting the natural wood structure of the veneer to remain visible. Accordingly, it is an object of the present invention to provide a veneer of common wood having a surface imitating that of a prized wood.

Another object is to provide such a veneer having a transfer surface devoid of imperfections caused by creases or bubbles in the heat-softened surface of the stamping foil.

A further object is to provide such a veneer exhibiting a strong adhesion of the transfer to the wood so that the final product is marked by a high level of resistance to abrasion, heat, solvents, water, steam, oils and the like.

It is also an object of the present invention to provide a veneer suitable for use in the furniture industry.

It is a further object to provide a method for producing such a veneer.

SUMMARY OF THE INVENTION

It has now been found that the above and related objects of the present invention are attained by first joining together without heat or pressure the non-thermoplastic surface of a common wood veneer and a hot stamping foil to form a composite intermediate product and then fusing the same with heat and pressure.

More particularly, one aspect of the present invention comprises a common wood veneer which provides the appearance of a prized wood and is comprised of the final product formed by fusing, with heat and pressure, an intermediate product formed by joining together, without heat or pressure, two thermoplastic contact adhesive layers. One contact adhesive layer is part of a common wood veneer having a non-thermoplastic surface with a thermoplastic multicomponent reactive contact adhesive layer applied thereon, and the other contact adhesive layer is part of a hot stamping foil having a thermo-adhesive surface with the contact adhesive layer applied thereon.

The non-thermoplastic surface is preferably primed. The final product is resistant to heat, water, humidity, solvents and oils because the fusing with heat and pressure causes reactions which render non-thermoplastic the contact adhesive layers of the common wood veneer and the contact adhesive and thermo-adhesive layers of the foil.

Another aspect of the present invention comprises a method for producing a veneer which provides the appearance of a prized wood. First, a thermoplastic multicomponent reactive contact adhesive layer is applied to the non-thermoplastic surface of a common wood veneer, and a thermoplastic contact adhesive layer is applied to the thermo-adhesive surface of a hot stamping foil. Next, the contact adhesive layers of the veneer and foil are united without heat or pressure. Finally, heat and pressure are applied to the united veneer and foil to effect fusion thereof. The uniting of the veneer and foil without heat or pressure, through the contact adhesive layers, provides a strong bonding which prevents the formation of creases and bubbles later when heat and pressure are applied to effect fusion.

In a preferred embodiment, the non-thermoplastic surface of the common wood veneer is primed prior to the application of the contact adhesive layer thereto. More particularly, the non-thermoplastic surface of the veneer is primed by applying thereto a solvent solution of a multicomponent reactive primer (preferably a reactive contact adhesive), and then allowing evaporation of the solvent from the solvent solution and reaction of the primer with the non-thermoplastic surface for at least 24 hours prior to applying the contact adhesive layer.

The contact adhesive layers are preferably applied from a solvent solution, with the uniting of the contact adhesive layers of the veneer and foil being completed after evaporation of the solvent from the contact adhesive layer solvent solutions. The step of applying heat and pressure to effect fusion of the foil and veneer also occurs after complete evaporation of the solvent from the contact adhesive layer solvent solutions.

Typically, the hot stamping foil is a laminate composed of a carrier film, a release layer, a protective lacquer layer, a colored layer and a thermo-adhesive layer. The step of applying heat and pressure to effect fusion of the foil and veneer acts to effect fusion of the protective lacquer layer, colored layer, thermo-adhesive layer and contact adhesive layer of the foil with the contact adhesive layer of the veneer. The contact adhesive layers and the thermo-adhesive layer are rendered non-thermoplastic by the fusion and the resultant reactions. To effect fusion of the foil and veneer, heat in excess of 50° C. and pressure of at least 3 kg/cm$^2$ are applied.

The thermoplastic multicomponent reactive contact adhesive layers of the present invention preferably comprise an aromatic polyurethane, isocyanate (preferably an aromatic di-isocyanate such as toluene di-isocyanate) and a catalyst. The thermoplastic contact adhesive layer applied to the thermo-adhesive surface of the hot stamping foil is preferably a thermoplastic multicomponent reactive contact adhesive layer.

After fusion of the veneer and foil, the fused product is overlacquered with a mixture of polyurethane and isocyanate, dried (typically for about 4 to 8 days, preferably 6, at 25°-30° C.) and then heated (at a temperature at about 55°-60° C. for about 30-60 minutes, preferably 60) to effect further fusion.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawing wherein:

FIG. 1 is a front elevation view, in cross section, of a vertically juxtaposed hot stamping foil and common wood veneer, the thickness of the various layers being exaggerated and non-proportional for the sake of clarity of illustration;

FIG. 2 is a front elevation view, in cross section, of the foil and veneer after the veneer has been sanded and primed and the contact adhesive layers added to the facing surfaces of the foil and veneer;

FIG. 3 is a front elevation view, in cross section, of the intermediate product formed by joining without heat or pressure the contact adhesive layers;

FIG. 4 is a side elevation view, partially in cross section, of the intermediate product in a hot platen press; and FIG. 5 is a side elevation view of the intermediate product in a hot roll press.

DETAILED DESCRIPTION OF THE PREFERRED EMBODIMENTS

Referring now to the drawing, and in particular to FIG. 1 thereof, therein illustrated in vertical juxtaposition are a conventional common wood veneer, generally designated by the reference numeral 10, and a conventional hot stamping foil, generally designated by the reference numeral 12. The common wood veneer 10 comprises a relatively thin layer or foil of a common wood having a non-thermoplastic surface 14 adapted to be mated with the hot stamping foil 12. As further described hereinbelow, the rear surface 15 of the common wood veneer 10 may be primed, for example, with one or more thin primer coats (not shown) of a reactive contact adhesive, to balance any coating subsequently applied to the face 14 of the common wood veneer and avoid rolling of the veneer. The hot stamping foil 12 is comprised of a carrier film or paper 20 (such as mylar, cellophane or acetate), a release layer 22 (adapted to be removed with the carrier paper 20), a protective lacquer layer 24 (adapted to be exposed when the carrier film 20 and release layer 22 are removed), a colored layer 26 carrying the wood grain design to be transferred, and a thermo-adhesive layer 28 adapted to be secured to the non-thermoplastic surface of the common wood veneer 10 under conditions of heat and pressure.

Referring now to FIG. 2, in order to reduce the effective degree of surface irregularities on non-thermoplastic surface 14, the surface 14 can be sanded to provide a relatively flat and level surface. Then a primer layer 29 of a multicomponent reactive contact adhesive in a solvent solution may optionally be applied thereto. After the solvent is allowed to evaporate and the primer reacted for at least 24 hours with the surface 14, the primer becomes insensitive within limits to heat, solvents, water, humidity and the like as well as inseparable from the veneer surface.

A layer of a contact adhesive in a solvent solution is applied both to the exposed surface of the thermo-adhesive layer 28 of the hot stamping foil and the exposed (sanded and primed) non-thermoplastic surface 14 of the common wood veneer 10, thereby forming the contact adhesive layer 30 on the hot stamping foil 12 and the contact adhesive layer 32 on the common wood veneer 10. The contact adhesive layer 32 of the common wood veneer 10 is a multicomponent reactive contact adhesive, and the contact adhesive layer 30 of the hot stamping foil 12 is preferably either also a multicomponent reactive contact adhesive or a potentially reactive portion thereof, as will be discussed in further detail hereinbelow. The multicomponent reactive contact adhesive is formulated from a special composition, which are originally thermoplastic for a period of time (typically a few hours) after solvent evaporation from the solvent solution, but shortly thereafter becomes non-thermoplastic.

A preferred multicomponent reactive contact adhesive is a mixture of an aromatic polyurethane, an isocyanate, and a catalyst. The aromatic polyurethane may be a contact adhesive available under the trade designation G 4610 available from K. J. Quinn of Leinfelden, W. Germany. Two surfaces coated with this contact adhesive and completely dried may be united, even after days, at 20°–40° C. by finger pressure alone and firmly adhere to one another. The material is apparently produced by the addition of isocyanates to an excess of polyols. It contains no free NCO groups, but contains reactive OH groups which react with aromatic isocyanates slowly on their own and faster in the presence of catalyst. The mixing of the G 4610 with an aromatic isocyanate and catalyst commences a reaction which renders the G 4610 non-contact adhesive, insoluble and non-thermoplastic. The aromatic isocyanate is preferably a high molecular weight copolymer of a polyol with an aromatic isocyanate (the copolymer being in a 75% solution of ethyl acetate, with 13% reactive NCO groups), this material being available under the trade name IMPRAFIX TH from Bayer. The catalyst is preferably a mixture of nitrated derivatives of a metallorganic compound in a solvent solution (e.g. methyl ethyl ketone and ethyl acetate), available under the trade name IMPRAFIX BE from Bayer. The catalyst promotes both addition reactions and the polymerization of isocyanate.

Once the G 4610, IMPRAFIX TH and IMPRAFIX BE are mixed together, several reaction patterns are noted: (1) At ambient temperatures of 20°–40° C., the isocyanate undergoes primary reactions with the available hydroxyl, amine and water groups to produce soluble urethanes, insoluble ureas and amines, respectively (the latter amines reacting with additional isocyanate to give additional insoluble ureas). (2) At temperatures over 50° C. and in the presence of the catalyst, the isocyanate under goes secondary reactions with urethane and ureas to produce allophanates and biurets, respectively, for increasing crosslinking and branching levels in concurrent polymerization reactions. (3) In the presence of the catalyst and at temperatures over 50° C., the very reactive aromatic di-isocyanates (such as toluene di-isocyanate) yield a high proportion of polymerized polyfunctional isocyanurates which are insoluble and extremely stable thermally. In combination with the ongoing secondary reactions, the polymerization reaction results in a highly crosslinked, insoluble product.

The appropriate level of each component of the multicomponent reactive contact adhesive is easily determined by those skilled in the chemical arts. Low levels of isocyanate, catalyst or temperature result in poor adehesion and solubility of the contact adhesive; high levels of each result in a short contact time (that is, the period after mixing until the materials become non-contact adhesive), a higher concentration of the monomer vapor in the air (these concentrations typically being regulated by law because of their harmful or even toxic nature), brittleness and rigidity. Suitable porportions by volume for the G 4610 (as a 24 weight % solution of G 4610 ethyl acetate): PREMAFIX TH: PREMAFIX BE range from 100:4:4 to 100:10:6.

While additional catalyst and isocyanate reduce the contact time, the contact time is also influenced by such other factors as the type of isocyanate (aromatic di-isocyanates such as toluene di-isocyanate being more reactive than aromatic mono-isocyanates which in turn are more reactive than aliphatic isocyanates), dilution of the formulation, temperature of the mixture, temperature and humidity in the air and on the surface, pH of the surface, etc. For example, where the humidity in the air is very high (e.g., 80–90%) the contact time of the reactive contact adhesive layer may be extended by blowing dry hot air on the surface for the first five minutes after application.

As earlier noted, before the non-thermoplastic surface 14 of a common wood veneer 10 receives its layer of reactive contact adhesive 32, the opposite or rear surface 15 is preferably primed with a reactive contact adhesive until it is completely impregnated, all the way to face 14. For this purpose a 100:10:6 or 100:8:6 formulation is suitable, the purpose of the coating being to balance the subsequent coating on the face 14 and avoid rolling of the veneer. After the rear surface coating is dry (e.g., air dried at 25°-30° C. for about 48 hours), the face 14 of the veneer may be sanded, coated with a thin primer layer 29 of a 100:10:6 or 100:8:6 formulation and air dried for 24 hours. Then one or more thin coats 32 of a formulation with a longer contact time, for example, a 100:5:5 formulation, are applied to the dried primer layer 29.

Two thin coats of the reactive contact adhesive are better than one thick one in order to avoid foaming. The adhesion of the reactive contact adhesive layer to the non-thermoplastic surface is excellent, far superior to that than normally obtained with hot stamping foils, because the isocyanates of the formulation react with the wood (and in particular the hydroxyl groups of the cellulose) to form strong insoluble chemical adhesion bonds therewith.

The contact adhesive applied as layer 30 of the hot stamping foil is preferably a thin coat (about 0.02 millimeters thick) of either the reactive contact adhesive formulation with a low catalyst and isocyanate level (for example, 100:4:4) or a potentially reactive contact adhesive without any isocyanate or catalyst therein (in other words, simply the G 4610 in ethyl acetate). Where the potentially reactive coating is devoid of isocyanate and catalyst, the layer 30 on the foil remains contact adhesive for days and only the contact time of the reactive contact adhesive coat 32 of the veneer must be considered. The coating of the foil will, however, fuse with the reactive formulation of layer 32 on the veneer 10, reacting with its isocyanate and catalyst to become non-thermoplastic and resistant to heat about three hours after joinder of the layers 30, 32. If the reactive contact adhesive is used as layer 30 of the hot stamping foil 12, the contact time of the foil is only about 90 minutes.

It will be appreciated that, instead of G 4610, the present invention may employ other polyurethane systems and even non-polyurethane systems having qualities similar to those of G 4610. Similarly, the G 4610 may be modified with various additives not adversely affecting its essential properties such as polyesters, acrylics, epoxies, alkyds, styrols, ureas, amides, vinyls, castor oil and its derivatives, diols, polyols, etc. Further, the G 4610 may be used in combination with other isocyanates and catalysts to form the multicomponent reactive contact adhesive.

Referring now to FIG. 3, therein illustrated is an intermediate product, generally designated by the reference numeral 34, formed by joining together without heat or pressure the two thermoplastic contact adhesive layers 30 and 32 of the hot stamping foil 12 and common wood veneer 10, respectively. The joinder of the two contact adhesive layers 30, 32 is performed after solvent evaporation, but while they are still thermoplastic—that is, within the contact time. The joinder of the two contact adhesive layers 30, 32 without heat and without pressure provides a bond which, it is believed, is instrumental in preventing the later formation of creases or bubbles when heat and pressure are applied to the intermediate product 34 to form the final product. The bonding of the contact adhesive layers 30, 32 is immediate so that the intermediate product 34 may be transported as a composite unit through the subsequent steps of the manufacturing process.

It will be appreciated that, while the contacting of the two dry surfaces within the contact time is stated to be without heat or pressure, in point of the fact, this terminology is intended to encompass ambient or near ambient temperatures of 20°-40° C. and minimum contact pressures of the order asserted by fingers (about 1 kg/cm$^2$). This low temperature and pressure and uniting of the hot stamping foil and the veneer is in sharp contrast to the conventional practice in which a hot stamping foil is stamped on the veneer using hot rollers or a platen press. In the conventional case with rollers, at temperatures below 230° C. imperfect adhesion is obtained and at temperatures over 230° C. the polyester carrier film of the hot stamping foil tends to melt, shrink, and become pressed between the hard ribs of the wood structure, thereby forming creases. Furthermore, at such high temperatures the plastic layers of the foil tend to decompose, with the decomposition gases forming bubbles within the foil which can lead to rejection of the transfer.

After formation of the intermediate unit 34, heat and pressure are applied in conventional fashion to complete fusion of the foil 12 and veneer 10 of the intermediate product 34. More particularly, the heat and pressure act to effect fusion of the protective lacquer layer 24, the colored layer 26, the thermo-adhesive layer 28, and the contact adhesive layer 30 of the foil 12 with the contact adhesive layer 32 of the veneer 10, the fusion rendering non-thermoplastic the contact adhesive layers 30, 32 and thermo-adhesive layer 28. It is believed that under the conditions of heat and pressure the still thermoplastic protective lacquer layer 24 and colored layer 26 actually fuse into the still thermoplastic contact adhesive layers 30, 32.

It will be appreciated that while the heat and pressure need not be applied immediately after formation of the intermediate product 34, it should be applied while the united surfaces 30, 32 are still thermoplastic. A delay of a few hours after union is preferred to allow the bonding to consolidate. Preferably the heat applied is sufficient to bring the contact adhesive layers 30, 32 to an excess of 50° C. (preferably 50°-180° C.) so as to achieve the secondary and polymerization reactions described above, and the pressures applied are at least 3 kg/cm$^2$ (preferably 3-10 km/cm$^2$)

The heat and pressure may be applied in a variety of different ways, generally either through a hot platen press generally designated 36, as illustrated in FIG. 4, or a hot roll press generally designated 38, as illustrated in FIG. 5, or both. Referring now to FIG. 4, the intermediate product 34 is placed in a conventional hot platen press 36 having an upper platen 40, which is mobile vertically in alternate directions, and a fixed lower platen 42. By actuating the press, the hot upper platen 40 lowers and compresses the intermediate product 34 causing the aforementioned fusion. Referring now to FIG. 5, alternatively, the intermediate product 34 is passed through a hot roll press 38, similar to the hot platen press 36 except that the upper and lower rolls 44 and 46 are substituted for the platens 40 and 42 of the hot platen press, with similar effect.

In the hot platen press, temperatures of about 80°–120° C. and pressures of about 3–4 kg/cm$^2$ are utilized in conjunction with a long pressure dwell of, e.g., about 30 seconds and more. In the hot roll press, temperature of about 180° C. and pressures of 6–10 kg/cm$^2$ are employed. The long dwell time in the platen press compensates for the low pressure and low temperature which enable transfers to be made onto fragile non-thermoplastic structures sensitive to pressure or containing heat-sensitive or pressure-sensitive internal layers—e.g., door panels having thin external wood sheets and a thick internal layer of foam or a beehive of kraft paper.

Depending on the size of the available presses, the final product can be created in appropriate dimensions for the furniture industry, typically from 40×60 to 700×260 centimeters.

After removal of the final product from the hot platen press 36 of FIG. 4 or the hot roll press 38 of FIG. 5, peeling away of the carrier film 20 and release layer 22 exposes the lacquered colored layer 26 through which is visible the original and transferred wood designs. The transferred surface is dry and scotch tape-proof, resistant to water and alcohol, and fairly abrasion resistant; the natural wood structure of the common wood veneer 14 (even any "ticks" present) is visible on the colored layer 26.

Further enhancement of the transfered surface 26 or 24, 26 is obtained by overlacquering the same with several thin layers of a suitable lacquer. A prefered lacquer is a mixture of polyurethane and isocyanate in volume proportions of 2:1, to 2:1.5, both in a 35 weight % solution of solvent (such as ethyl acetate and toluene). A preferred polyurethane is available under the trade designation 551.4.0.000, and a preferred isocyanate is available under the trade designation 820.9.0.0103, both from Siam Ivis of Cormano (Milan), Italy. The overlacquer may be applied conventionally, e.g., by rollers or a spray gun. Overlacquering of the transfer surface provides additional resistance to the transfer as well as enabling variation in the colors of the transfer surface.

After removal of the carrier film 20 and release layer 22, the fused and overlacquered product is further treated to allow completion of the polyurethane - isocyanate - catalyst system reactions. Thus, it is dried for about 4–8 (preferably six) days in a ventilated oven with temperatures of 25°–30° C. and controlled humidity to allow the primary and a part of the secondary reactions to occur. Then the temperature is raised to 55°–60° for 30–60 minutes (preferably 60 minutes) in order to allow the remainder of the secondary reactions and the polymerization of the isocyanate to occur.

Once these reactions are terminated, the bonds between the common wood veneer, the color transfer (that is, the transferred wood grain design) and the surface of the transfer are resistant to heat, water, humidity, solvents, oils, abrasions and the like, thereby rendering it highly suitable for use in the furniture industry. By way of comparison with a conventional product, in the finished product of the present invention the surface of the transferred design may be lacquered in subsequent finishing operations, or washed with water, alcohol, solvents or solvent-containing cleaning fluids. The product may be pressed in a platen press at 110° C. for 80 seconds, as usual in furniture production, without effect on the bond or on the transferred wood grain design, e.g., when glued with aqueous glues, such as urea or urea melanine, or solvent glues. For example, while immersion of a conventional hot stamped veneer in ethyl acetate solvent for only two minutes results in the whole thermoplastic hot stamped layer dissolving in lumps, by way of contrast immersion of the product of the present invention for 15 minutes in ethyl acetate left the transferred wood grain design intact, only a bit opaque. (when overlacquered in a subsequent finishing step of the furniture production, this product of the present invention will be given the desired degree of gloss or opacity.) No delamination occurred even after immersion for 10 days in water.

Sixty strokes of an ethyl acetate soaked pad destroy the wood grain design of a conventional hot stamped design while a hundred strokes leave no trace on the product of this invention. When a veneer, 40×60 cm coated with a thermoplastic layer and hot stamped conventionally, is pressed in a platen press at 110° C. for 80 seconds, the whole thermoplastic surface softens and flows into the wood structure. The design is destroyed by this flow and by the blisters of the trapped, expanding air. This does not occur with the non-thermoplastic layer of the present invention.

It will be appreciated that the non-thermoplastic surface 14 of the common wood veneer 10 may itself be a color layer 26 according to the present invention or a similar surface which has been overlacquered as described above. Such a second transfer of the wood grain design onto a surface of a wood panel already covered with a first non-thermoplastic wood grain transfer allows the creation of a wood surface appearing to be composed of squares or rhombuses of two different woods. The transfer, e.g., of a wood grain design, onto a portion of a wood panel previously lacquered with an insoluble transparent or colored lacquer allows the creation of a panel with two color motifs.

It is theorized that the remarkable performance of the product of the present invention results from the conversion of the formerly thermoplastic layers of the hot stamping foil into non-thermoplastic layers and the conversion of the originally thermoplastic contact adhesive layers of the common wood veneer and hot stamping foil into non-thermoplastic layers.

To summarize, the product of the present invention is a veneer which provides the appearance of a prized wood with a remarkable detail of imitation and an absence of imperfections in the transferred wood design due to creasing or bubbling of the hot stamping foil during the manufacturing process. The final product can be produced in dimensions suitable for use in the furniture industry and affords the various resistances to abrasion, heat, water, steam, oils and solvents which are required for such veneers both during and after the furniture manufacturing process.

Now that the preferred embodiments of the present invention have been shown and described in detail, various modifications and improvements thereon will become readily apparent to those skilled in the art. Accordingly, the spirit and scope of the present invention is to be limited only by the appended claims, and not by the foregoing specification.

What is claimed is:

1. A method for producing a veneer which provides the appearance of a prized wood, comprising the steps of:

(A) applying at least one thermoplastic multicomponent reactive contact adhesive layer to the non-thermoplastic surface of a common wood veneer and a thermoplastic contact adhesive layer to the thermo-adhesive surface of a hot stamping foil;

(B) uniting the contact adhesive layers of the veneer and foil without heat or pressure; and (C) applying heat and pressure to the united veneer and foil to effect fusion thereof.

2. The method of claim 1 wherein the hot stamping foil comprises a protective lacquer layer, a colored layer and a thermo-adhesive layer.

3. The method of claim 1 wherein the non-thermoplastic surface of the common wood veneer is primed prior to applicaiton of the reactive contact adhesive layer thereto.

4. The method of claim 3 including the step of priming the non-thermoplastic surface of the veneer by applying thereto a reactive solvent solution of primer and then allowing evaporation of the solvent from the solvent solution and reaction of the primer with the non-thermoplastic surface for at least 24 hours prior to applying the reactive contact adhesive layer.

5. The method of claim 1 wherein in the application step the contact adhesive layers are applied from a solvent solution.

6. The method of claim 5 wherein the step of uniting the contact adhesive layers of the veneer and foil is completed after evaporation of the solvent from the contact adhesive layer solvent solutions.

7. The method of claim 6 wherein the step of applying heat and pressure to complete fusion of the foil and veneer occurs after complete evaporation of the solvent from the contact adhesive layer solvent solutions.

8. The method of claim 2 wherein the step of applying heat and pressure to effect fusion of the foil and veneer acts to effect fusion of the protective lacquer layer, colored layer, thermo-adhesive layer and contact adhesive layer of the foil with the contact adhesive layer of the veneer.

9. The method of claim 8 wherein said contact adhesive layers and said thermo-adhesive layer are rendered non-thermoplastic by said fusion.

10. The method of claim 1 wherein, in the step of applying heat and pressure to effect fusion of the foil and veneer, heat in excess of 50° C. and pressure of at least 3 $kg/cm^2$ are applied.

11. The method of claim 1 wherein said thermoplastic contact adhesive layer applied to the thermo-adhesive surface of hot stamping foil in step A is a thermoplastic multicomponent reactive contact adhesive layer.

12. The method of claim 1 wherein the thermoplastic multicomponent reactive contact adhesive layer comprises an aromatic polyurethane, an isocyanate, and a catalyst.

13. The method of claim 1 wherein after step C the fused veneer and foil is air dried and then heated to effect further fusion.

14. The method of claim 13 wherein said fused veneer and foil is dried for about 4–8 days at 25°–30° and then heated at a temperature of about 55°–60° C. for about 30–60 minutes.

15. The method of claim 13 wherein after step C the fused veneer and foil is overlacquered with a mixture of polyurethane and isocyanate prior to air drying and heating.

16. The product produced by the method of claim 1.

17. The product produced by the method of claim 3.

18. A veneer which provides the appearance of a prized wood comprising the final product formed by fusing with heat and pressure an intermediate product formed by joining together without heat or pressure the two thermoplastic contact adhesive layers of (a) a common wood veneer having a non-thermoplastic surface with a thermoplastic multicomponent reactive contact adhesive layer thereon, and (b) a hot stamping foil having a thermo-adhesive surface with a thermoplastic contact adhesive layer thereon.

19. The veneer of claim 18 wherein said non-thermoplastic surface of said common wood veneer is primed.

20. The veneer of claim 18 wherein said final product is resistant to heat, water, humidity, solvents and oils because said fusing with heat and pressure renders non-thermoplastic said contact adhesive layers of said common wood veneer and said contact adhesive and thermo-adhesive layers of said foil.

21. The veneer of claim 18 wherein the thermoplastic multicomponent reactive contact adhesive layer comprises an aromatic polyurethane, an isocyanate, and a catalyst.

* * * * *

UNITED STATES PATENT AND TRADEMARK OFFICE
CERTIFICATE OF CORRECTION

PATENT NO. : 4,743,509

DATED : May 10, 1988

INVENTOR(S) : Vladimiro Kokrhanek

It is certified that error appears in the above-identified patent and that said Letters Patent are hereby corrected as shown below: Title Page:

Abstract page, under "Foreign Application Priority Data," delete "Jul. 10, 1983" and add --Oct. 7, 1983--.

Signed and Sealed this

Fifteenth Day of November, 1988

*Attest:*

DONALD J. QUIGG

*Attesting Officer* *Commissioner of Patents and Trademarks*